United States Patent

[11] 3,583,644

| [72] | Inventor | John J. Mulkey<br>Baltimore, Md. |
|---|---|---|
| [21] | Appl. No. | 828,499 |
| [22] | Filed | May 28, 1969 |
| [45] | Patented | June 8, 1971 |
| [73] | Assignee | Bethlehem Steel Corporation |

[54] BLAST FURNACE FLUID FUEL INJECTION APPARATUS
4 Claims, 3 Drawing Figs.

[52] U.S. Cl. ................................................ 239/590
[51] Int. Cl. ............................................ F23d 13/28
[50] Field of Search .................................. 239/589,
590, 601, 505, 231, 232, 507, 451, 452, 455, 456

[56] References Cited
UNITED STATES PATENTS

| 719,573 | 2/1903 | Fageol | 239/452 |
| 1,622,090 | 3/1927 | Comins et al. | 239/451 |
| 1,983,634 | 12/1934 | Nichols | 239/590 |
| 3,186,471 | 6/1965 | Costenbader et al. | 431/189 |
| 3,224,488 | 12/1965 | Skonecke et al. | 239/505 |

FOREIGN PATENTS

| 3,248 | 3/1885 | Great Britain | 239/590 |

Primary Examiner—M. Henson Wood, Jr.
Assistant Examiner—Edwin D. Grant
Attorney—Joseph J. O'Keefe ABSTRACT: A fluid fuel injection nozzle for blast furnaces including restriction means whereby the turbulence and velocity of the fluid fuel are increased and restraining means whereby the restriction means is held in the fluid fuel injection nozzle.

PATENTED JUN 8 1971 3,583,644

INVENTOR
John J. Mulkey

BLAST FURNACE FLUID FUEL INJECTION APPARATUS

BACKGROUND OF THE INVENTION

This invention is directed to an improvement in fluid fuel injection apparatus used in blast furnaces, as shown and described in U.S. Pat. No. 3,186,471 issued June 1, 1965 to E. A. Costenbader et al., and having a common assignee.

Recent developments in increasing the efficiency of the blast furnace in smelting ores, such as iron ore, include the use of fluid hydrocarbon fuels injected into the blast furnace to replace a part of the coke normally used. The fuel is injected by means of a fluid fuel injection apparatus inserted into the tuyeres of the furnaces. The fluid fuel is admixed with heated air in the hot blast area of the furnace prior to entering the combustion area thereof. The hot blast air is usually at a temperature of about 1,500° F. or higher. At these temperatures, the fluid fuel has a tendency to sludging, carbonization, thermal cracking, the formation of clogging clinkers or coking resulting in partial or complete clogging of the nozzle in the fluid fuel injection apparatus. The nozzle must be removed from the furnace for cleanup resulting in decreased furnace efficiency and cost of operation.

It is therefore an object of this invention to provide an improvement in the fluid fuel injection nozzle to increase the turbulence and velocity of the fluid fuel whereby clogging and coking of the fluid fuel in the injection nozzle are reduced if not completely eliminated.

SUMMARY OF THE INVENTION

Broadly, the improvement of the invention includes providing restriction means whereby the forward passage of the nozzle through which the fluid fuel is introduced into the tuyere is constricted, thereby increasing the velocity and turbulence of the fluid fuel and restraining means attached to the outer surface of the forward portion of the nozzle whereby the restriction means is retained in the fluid fuel nozzle.

PREFERRED EMBODIMENT OF THE INVENTION

Figure 1:
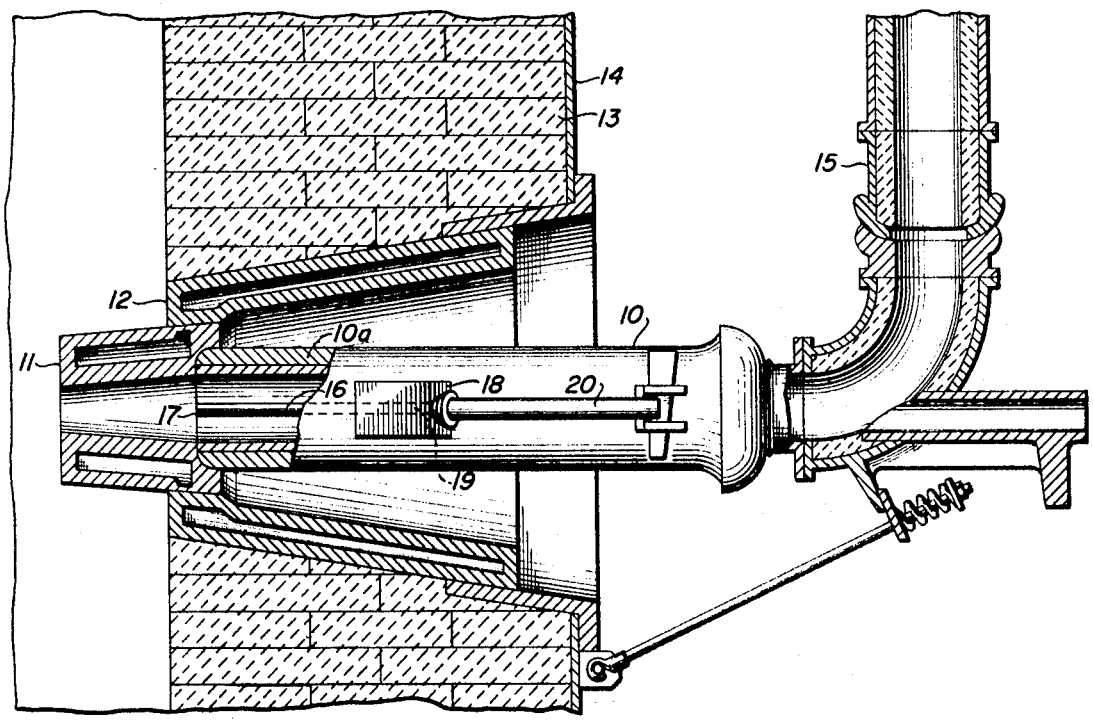
FIG. 1 is a side elevation view of a fuel injection apparatus inside a blowpipe of a blast furnace and is the same as FIG. 1 in U.S. Pat. No. 3,186,471.

As shown in FIG. 1 a conventional blowpipe 10 is fitted in a tuyere 11 inserted in tuyere cooler 12. The above assembly is in position in a blast furnace having a refractory wall 13 and an exterior outer metallic shell 14. The blowpipe 10 is connected to a bustle pipe (not shown) by a piping assembly 15 through which the hot blast air required for the reduction process is introduced into the combustion area of the blast furnace. The fluid fuel injection nozzle 16 is shown inserted into the blowpipe 10. The discharge portion 17 of the nozzle 16 is so positioned that the fluid fuel injected into the furnace is admixed with hot blast air in the tuyere area prior to entering the combustion area of the furnace. By a fluid fuel I mean a hydrocarbon material in either a gaseous or liquid state, for example, natural gas and fuel oil. Because the temperature of the hot blast air is about 1,500° F. and higher, the fluid fuel is ignited almost instantaneously as it comes into contact with the hot blast air. The nozzle 16 extends rearwardly in the blowpipe at an angle to the wall 10a thereof and extends through the wall 10a and is attached to the outer periphery thereof by a plate 18. The rear portion 19 of the nozzle 16 is connected to a fluid fuel feedline (not shown) by the pipe 20.

Figure 2:
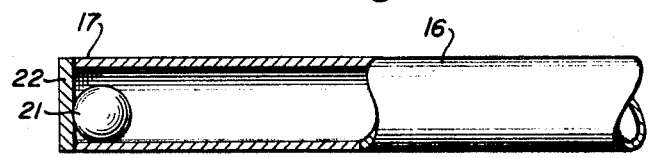
FIG. 2 is an enlarged cross section view of the forward portion of the nozzle.
Figure 3:
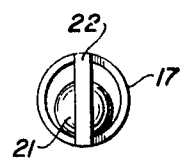
FIG. 3 is a head-on view of the nozzle.

Turning now to FIG. 2, a restricting means 21 is shown in position in the discharge portion 17 in the nozzle 16. The means 21 may be a spherical member and may be of any suitable material which will not be affected by the fluid fuel injected into the furnace nor by the temperatures, for example 1,500° F. and higher, in this environment. It has been found that with gaseous fuels a less dense material may be used as a restricting means while liquid fuels require more dense materials. I prefer to use a stainless steel ball. The means 21 should have a diameter not larger than 0.75 times and not smaller than 0.65 times the diameter of the nozzle 16. As shown in FIG. 3, a restraining means 22 is fixedly attached, for example by welding, to the end of the nozzle 16. The restraining means also must be of a material which will not be affected by the components in the fluid fuel, or by the temperatures in the environment. The restraining means may be a stainless steel rod having a diameter or a width which is sufficiently small to allow easy flow of the fluid fuel out of the nozzle 16 but of sufficient size to prevent the restriction means 21 from being ejected from the nozzle 16 into the furnace. I have found that a restraining means having a diameter or width not more than 0.15 times the diameter of the nozzle 16 may be used.

Normally, the fluid fuel is injected into the furnace as a ropelike stream having little turbulence through the nozzle 16. The restricting means 21 changes the ropelike stream into a diverging cone-shaped stream which is turbulent. Since the volume of fluid fuel injected into the furnace in a given time has not been decreased, obviously the velocity of the fluid fuel is increased by inserting the restricting means 21 in the nozzle 16. Changing the shape of the stream of fluid fuel injected into the furnace and increasing the turbulence and velocity of same has significantly reduced if not completely eliminated the problem of thermal cracking, coking, sludging, carbonizing or forming clogging clinkers of the fluid fuels to which the fluid fuel injection nozzles were susceptible.

I claim:

1. In a fluid fuel injection apparatus for use in admixing fluid fuel with the hot blast air in a blast furnace said apparatus including a fluid fuel injection nozzle mounted inside a blowpipe, the improvement comprising:
   a. restriction means for increasing the velocity and turbulence of the fluid fuel being injected into the hot blast air, and
   b. restraining means for securing the restriction means of (a) in the injection nozzle.

2. The apparatus of claim 1 in which the restriction means of (a) is a stainless steel ball bearing.

3. The apparatus of claim 1 in which the restraining means of (b) is a stainless steel rod fixedly attached to the front end of the injection nozzle.

4. In a fluid fuel injection apparatus for use in injecting a fluid fuel into a blast furnace wherein said fluid fuel is admixed with a hot blast of air in said furnace to aid in the combustion thereof, said apparatus including a fluid fuel injection nozzle mounted inside a blowpipe, the improvement comprising:
   a. a steel rod having a diameter of not more than 0.15 times the inside diameter of said nozzle and fixedly attached to the front portion thereof, and
   b. a steel ball having a diameter of not more than 0.65 times and not less than 0.75 times the inside diameter of said nozzle, freely movable inside said nozzle and restrained from ejection therefrom by the steel rod of (a) whereby the forward passage of said nozzle is constricted to thereby increase the velocity and turbulence of said fluid fuel being injected into the furnace to significantly reduce sludging, carbonizing, thermal cracking and clinker formation in said nozzle.

UNITED STATES PATENT OFFICE
CERTIFICATE OF CORRECTION

Patent No. 3,583,644                    Dated June 8, 1971

Inventor(s) John J. Mulkey

It is certified that error appears in the above-identified patent and that said Letters Patent are hereby corrected as shown below:

Column 2, claim 4, lines 59 and 60, "not more than 0.65 times and not less than 0.75 times" should read -- not less than 0.65 times and not more than 0.75 times --.

Signed and sealed this 18th day of April 1972.

(SEAL)
Attest:

EDWARD M. FLETCHER, JR.             ROBERT GOTTSCHALK
Attesting Officer                    Commissioner of Patents